(12) United States Patent
Vijayrao et al.

(10) Patent No.: US 11,360,701 B1
(45) Date of Patent: Jun. 14, 2022

(54) MEMORY AND STORAGE CONTROLLER WITH INTEGRATED MEMORY COHERENCY INTERCONNECT

(71) Applicant: Meta Platforms, Inc., Menlo Park, CA (US)

(72) Inventors: Narsing Krishna Vijayrao, Santa Clara, CA (US); Christian Markus Petersen, Golden, CO (US)

(73) Assignee: Meta Platforms, Inc., Menlo Park, CA (US)

( * ) Notice: Subject to any disclaimer, the term of this patent is extended or adjusted under 35 U.S.C. 154(b) by 49 days.

(21) Appl. No.: 17/010,739

(22) Filed: Sep. 2, 2020

Related U.S. Application Data

(60) Provisional application No. 63/019,698, filed on May 4, 2020.

(51) Int. Cl.
*G06F 3/06* (2006.01)
*G06F 13/42* (2006.01)

(52) U.S. Cl.
CPC ............ *G06F 3/0658* (2013.01); *G06F 3/061* (2013.01); *G06F 3/0676* (2013.01); *G06F 3/0679* (2013.01); *G06F 13/4221* (2013.01); *G06F 2213/0026* (2013.01)

(58) Field of Classification Search
CPC ...... G06F 3/0658; G06F 3/061; G06F 3/0676; G06F 3/0679
See application file for complete search history.

(56) References Cited

U.S. PATENT DOCUMENTS

| | | | | |
|---|---|---|---|---|
| 2013/0054902 | A1* | 2/2013 | Biswas | G06F 13/1668 711/154 |
| 2015/0058524 | A1* | 2/2015 | Creta | G11C 13/0002 711/103 |
| 2016/0283375 | A1* | 9/2016 | Das Sharma | G06F 12/0806 |
| 2021/0311739 | A1* | 10/2021 | Malladi | G06F 13/1694 |

OTHER PUBLICATIONS

European Search Report for European Application No. 21167172.2, dated Sep. 15, 2021, 2 pages.

* cited by examiner

*Primary Examiner* — David E Martinez
(74) *Attorney, Agent, or Firm* — Van Pelt, Yi & James LLP

(57) ABSTRACT

A controller device is disclosed. The controller device comprises a communication interface that is configured to receive a data operation request via an interconnect bus. The controller device comprises an integrated interconnect protocol component that is configured to handle communication via the interconnect bus that supports coherency across a plurality of different processing devices external to the controller device. An integrated memory or storage controller component on the same controller device is configured to handle the data operation request including by being configured to manage communication with a memory or data storage device external to the controller device.

20 Claims, 7 Drawing Sheets

US 11,360,701 B1

MEMORY AND STORAGE CONTROLLER WITH INTEGRATED MEMORY COHERENCY INTERCONNECT

CROSS REFERENCE TO OTHER APPLICATIONS

This application claims priority to U.S. Provisional Patent Application No. 63/019,698 entitled MEMORY AND STORAGE CONTROLLER WITH INTEGRATED MEMORY COHERENCY INTERCONNECT filed May 4, 2020 which is incorporated herein by reference for all purposes.

BACKGROUND OF THE INVENTION

Increasingly, a number of technologies generate a large amount of data. For example, social media websites, autonomous vehicles, the Internet of things, mobile phone applications, industrial equipment and sensors, and online and offline transactions all generate a massive amount of data. In some cases, cognitive computing and artificial intelligence are used to analyze these data. The result of these growing sources of data is an increased demand for memory and storage. Therefore, improved techniques for memory and storage are desirable.

BRIEF DESCRIPTION OF THE DRAWINGS

Various embodiments of the invention are disclosed in the following detailed description and the accompanying drawings.

DETAILED DESCRIPTION

Figure 1A:
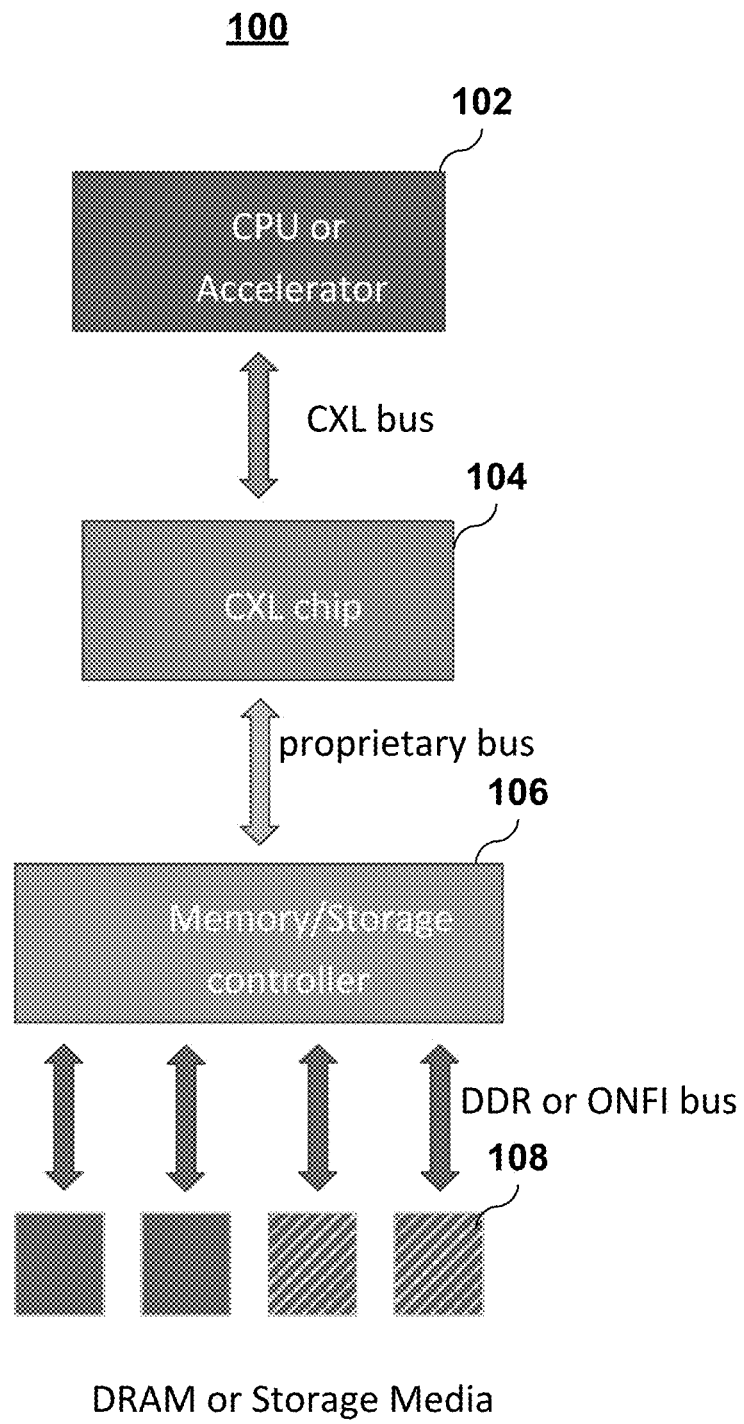
FIG. 1A illustrates an example of a system 100 in which a processor 102 (e.g., a CPU or an accelerator) accesses DRAM or other media 108 via a CXL chip 104 and a memory/storage controller 106.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Double Data Rate Synchronous Dynamic Random-Access Memory (DDR SDRAM) is a double data rate (DDR) synchronous dynamic random-access memory (SDRAM) class of memory integrated circuits used in computers. As dynamic random-access memory (DRAM) continues to increase in density and interface speeds continue to increase, the memory industry has gone through multiple generations, including the $1^{st}$ generation DDR1, $2_{nd}$ generation DDR2, $3^{rd}$ generation DDR3, $4^{th}$ generation DDR4, and 5th generation DDR5 industry standards.

PCI Express (Peripheral Component Interconnect Express), officially abbreviated as PCIe or PCI-e, is a high-speed serial computer expansion bus standard; it is a common motherboard interface for personal computer graphics cards, hard drives, solid-state drives (SSDs), Wi-Fi, and Ethernet hardware connections.

Computer systems currently utilize integrated DDR memory controllers for memory subsystems and PCIe for storage. However, these computer systems are inefficient because the software stack of DDR is very different from that of PCIe. For example, DDR-based systems are coherent, whereas PCIe-based systems are not.

To address this problem, the industry has designed a high performance I/O bus architecture known as the Compute Express Link (CXL) (see https://www.computeexpresslink.org/for additional information). CXL may be used to interconnect peripheral devices that can be either traditional non-coherent I/O devices or accelerators with additional capabilities. CXL makes all the transactions on the CXL bus coherent.

In other techniques, a central processing unit (CPU) or an accelerator accesses dynamic random-access memory (DRAM) or other media via a CXL chip and a memory/storage controller. Other media include storage media, persistent media, and the like. FIG. 1A illustrates an example of a system 100 in which a processor 102 (e.g., a CPU or an accelerator) accesses DRAM or other media 108 via a CXL chip 104 and a memory/storage controller 106. Memory/ storage controller 106 sends and receives data that flows between the processor and the processor's memory or storage. As shown in FIG. 1A, processor 102 communicates with CXL chip 104 via a CXL bus. CXL chip 104 communicates with memory/storage controller 106 via a proprietary bus. Memory/storage controller 106 communicates with a plurality of DRAMs or other media 108 via a low-power DDR SDRAM (LPDDR SDRAM) Bus, DDR Bus, ONFI Bus, ME Toggle Bus, or other media interfaces. DDR includes DDR, DDR2, DDR3, DDR4, and DDR5.

Figure 1B:
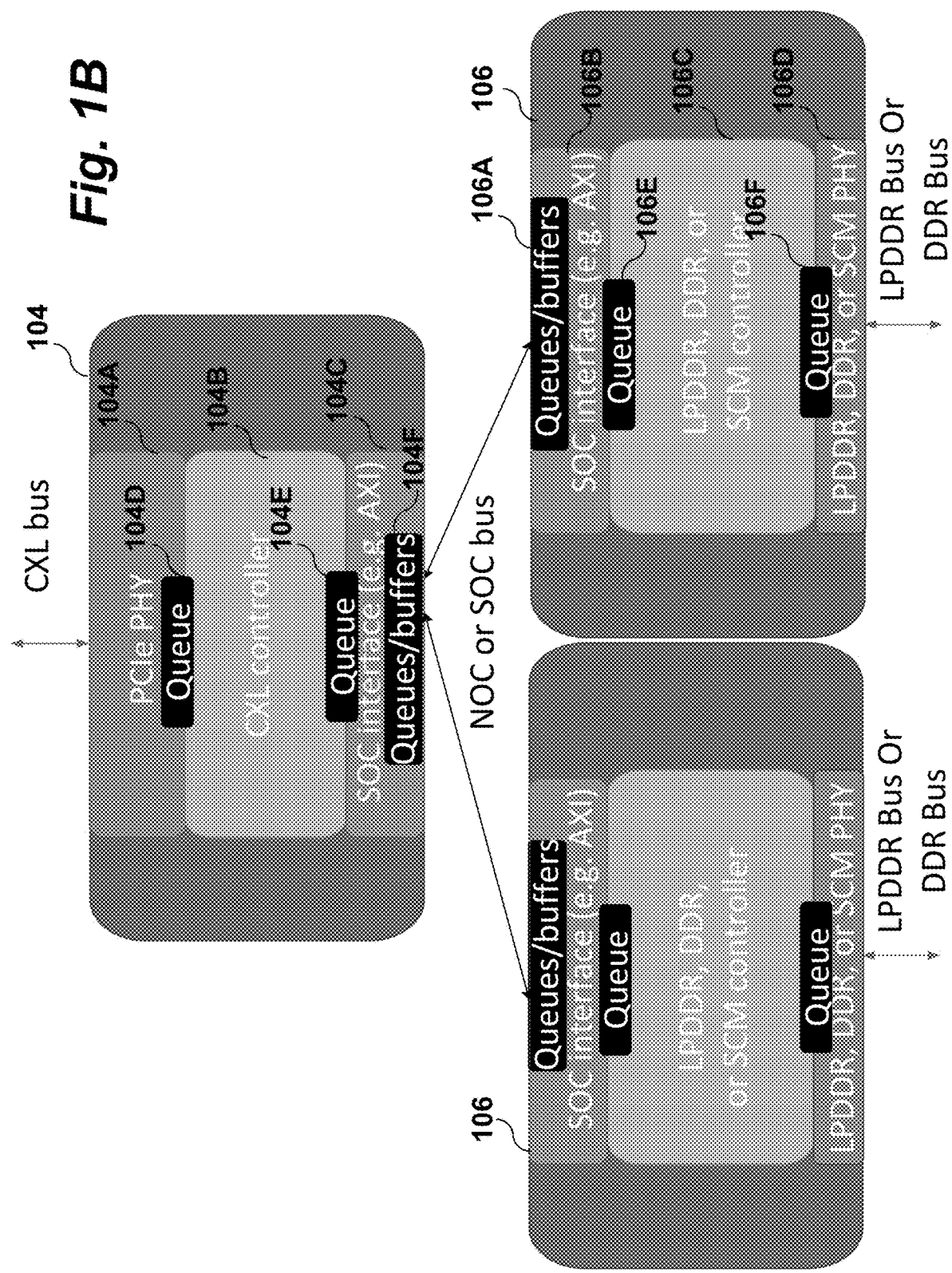
FIG. 1B illustrates a diagram of a CXL IP core connected to one or more memory/storage controller IP cores.

FIG. 1B illustrates a diagram of a CXL IP core connected to one or more memory/storage controller IP cores. CXL IP core 104 includes a PCIe physical interface (PHY) 104A, a CXL controller 104B, and a system on a chip (SOC) interface 104C, such as an Advanced eXtensible Interface (AXI). CXL IP core 104 communicates with one or more memory/storage controller IP cores 106 via a proprietary bus, such as a network-on-chip (NoC) bus or SOC bus. Memory/storage controller IP core 106 includes an SOC interface 106B, such as an AXI. Memory/storage controller IP core 106 further includes a memory or storage controller 106C, such as an LPDDR, DDR, or storage class memory (SCM) controller. Memory/storage controller IP core 106 further includes a PHY 106D, such as an LPDDR PHY or DDR PHY.

However, accessing DRAM or other media via a CXL chip and a memory/storage controller as shown in FIG. 1A and FIG. 1B results in higher latency and may produce interoperability issues which are difficult to debug. In addition, more logic is required, which increases chip area and cost.

The controller device in the present application comprises a communication interface configured to receive a data operation request via an interconnect bus. The device comprises an integrated interconnect protocol component on the controller device and is configured to handle communication via the interconnect bus that supports coherency across a plurality of different processing devices external to the controller device. The device comprises an integrated memory or storage controller component on the same controller device and is configured to handle the data operation request including by being configured to manage communication with a memory or data storage device external to the controller device.

Figure 2A:
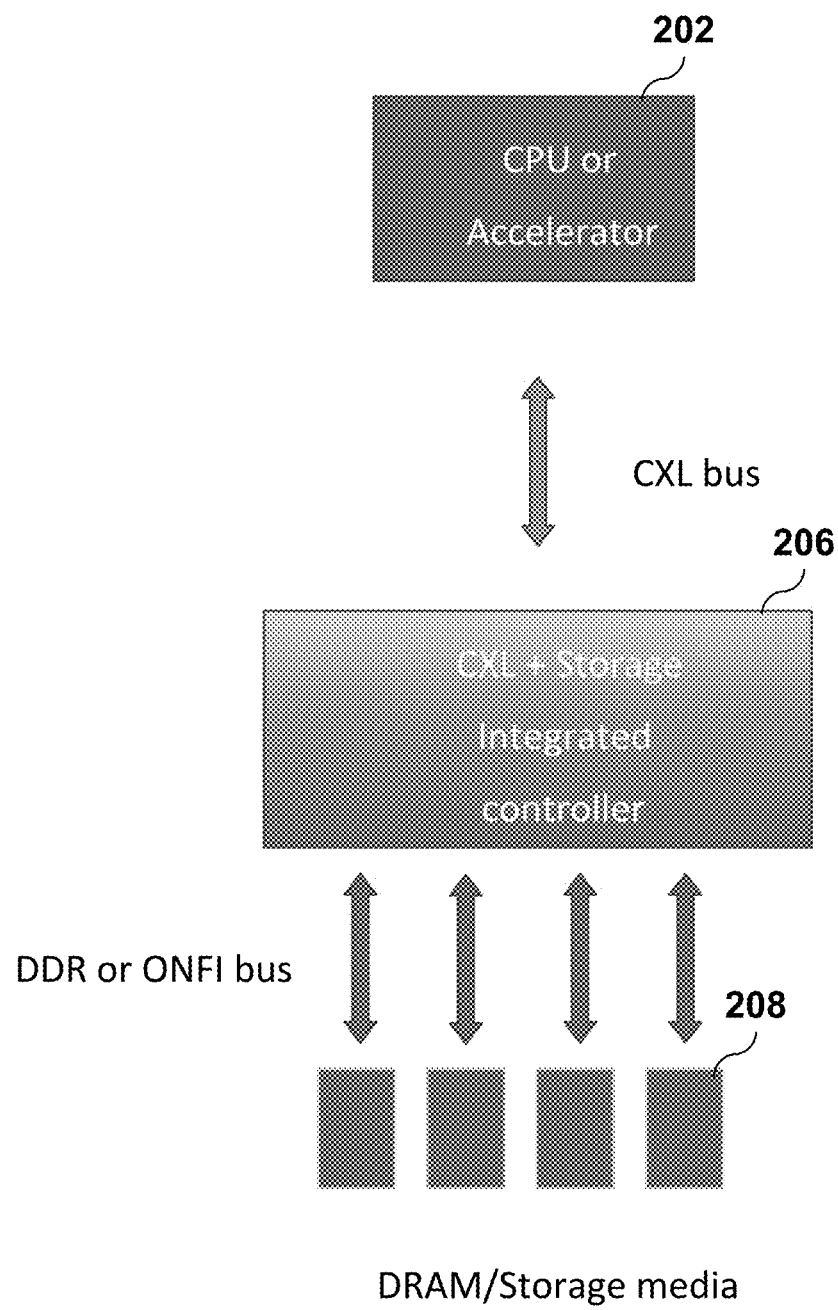
FIG. 2A illustrates an example of an improved system 200 in which a processor 202 (e.g., a CPU or an accelerator) accesses DRAM or other media 208 via an integrated controller 206 that integrates CXL and DDR/other storage protocols in a single device.

FIG. 2A illustrates an example of an improved system 200 in which a processor 202 (e.g., a CPU or an accelerator) accesses DRAM or other media 208 via an integrated controller 206 that integrates CXL and DDR/other storage protocols in a single device. Other media include storage media, persistent media, and the like. Examples of DRAM or other media 208 include low-power DDR SDRAM (LPDDR SDRAM), DDR, and storage class memory (SCM). As shown in FIG. 2A, a CPU or an accelerator 202 communicates with the integrated controller 206 via a CXL Bus. And the single integrated controller 206 communicates with a plurality of DRAMs and/or other media 208 via a low-power DDR SDRAM (LPDDR SDRAM) Bus, DDR Bus, ONFI Bus, ME Toggle Bus, or other media interfaces. For example, the single integrated controller 206 may include multiple controllers for different media types. The single integrated controller 206 may communicate with other types of devices via protocols other than DDR or ONFI, including other proprietary protocols.

Figure 2B:
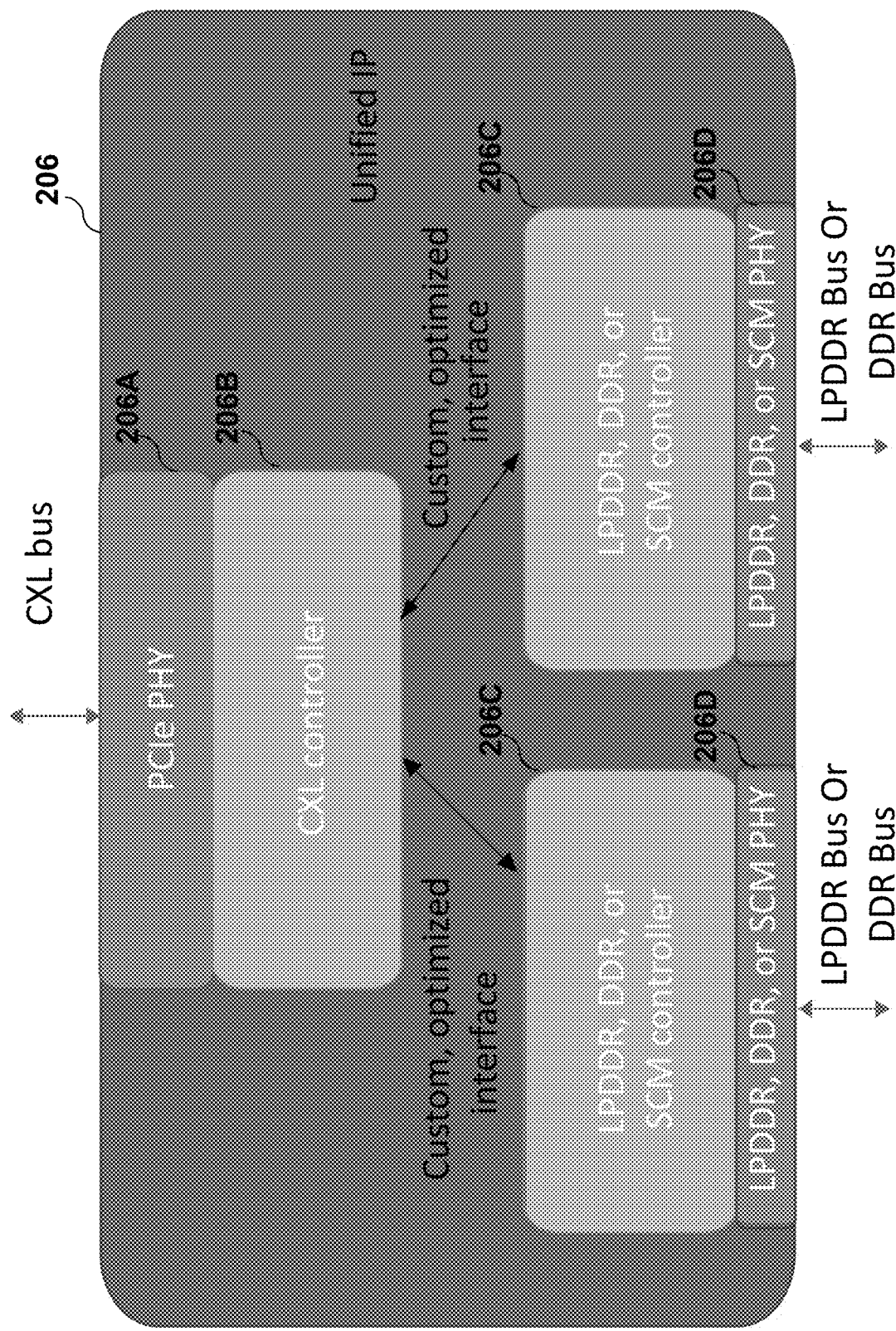
FIG. 2B illustrates a diagram of a single integrated controller IP core 206.
Figure 2C:
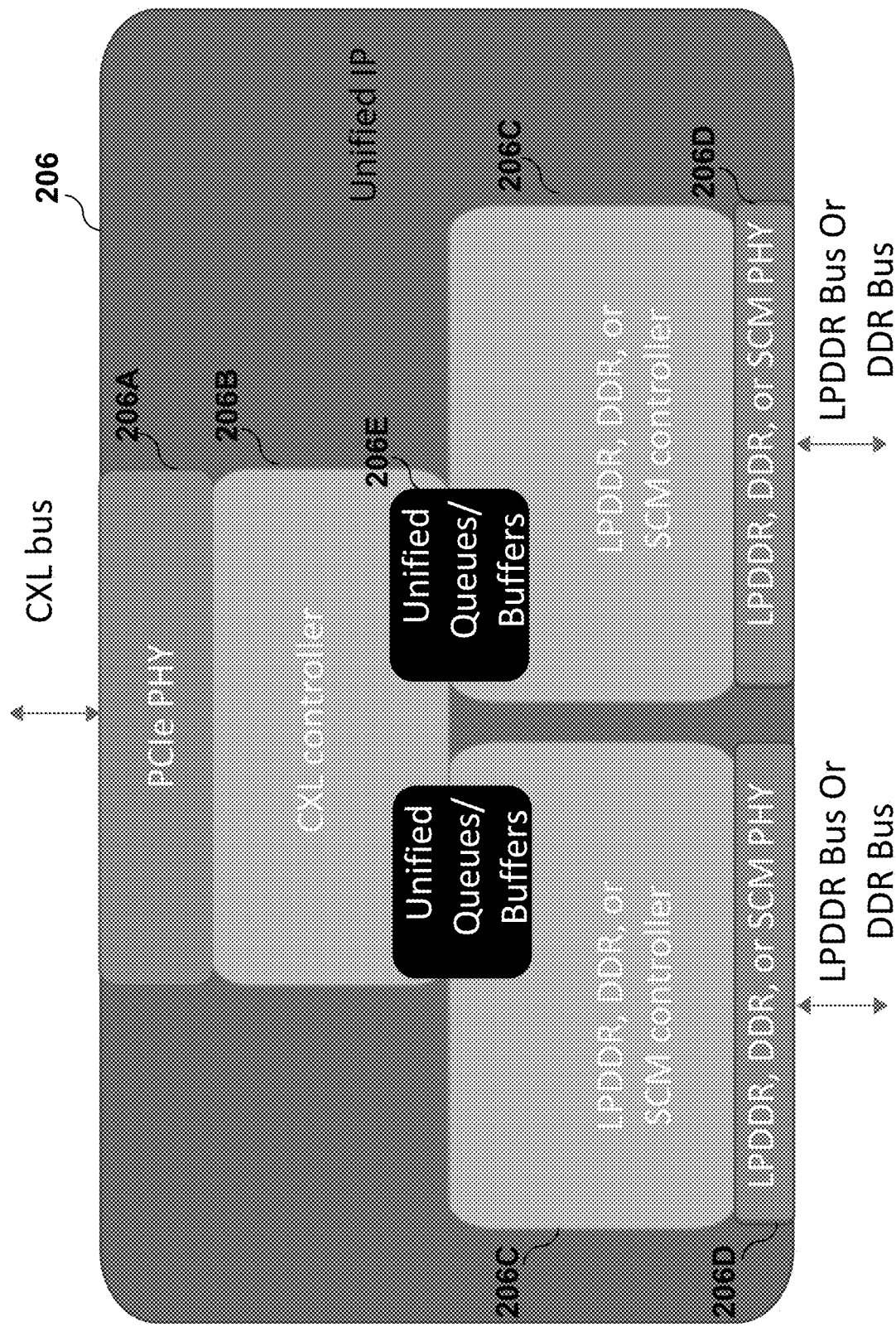
FIG. 2C illustrates another diagram of the single integrated controller IP core 206.

FIG. 2B illustrates a diagram of a single integrated controller IP core 206. The single integrated controller IP core 206 includes a communication interface configured to receive data operation requests (e.g., read or write requests) via an interconnect bus, such as a CXL Bus. The communication interface may be a PCIe physical interface (PHY) 206A. The single integrated controller IP core 206 further includes a CXL controller 206B. CXL controller 206B is an integrated interconnect protocol component on the single integrated controller IP core 206 that is configured to handle communication via the interconnect bus that supports coherency across a plurality of different processing devices (e.g., CPUs or accelerators) external to the integrated controller IP core 206. Integrated controller IP core 206 further includes one or more integrated memory or storage controller components, and each is configured to handle data operation requests including by being configured to manage communication with a memory or storage device external to the integrated controller IP core 206. CXL controller 206B communicates with the one or more memory/storage controllers 206C via custom and optimized interfaces. For example, the one or more memory/storage controllers 206C may include an LPDDR controller with an LPDDR PHY 206D, a DDR controller with a DDR PHY 206D, and an SCM controller with an SCM PHY 206D. CXL controller 206B has a direct connection with each of the memory/storage controllers via a custom and optimized interface. The improved system 200 eliminates the need for the SOC interface 104C on the CXL IP core 104 and the SOC interface 106B on the memory/storage controller IP core 106 in the traditional system 100. An SOC interface is an example of translators that may be removed from the improved system. The improved system 200 also eliminates the need for using a standardized bus for the communication between the CXL IP core 104 and a memory/storage controller IP core 106. FIG. 2C illustrates another diagram of the single integrated controller IP core 206.

In some embodiments, the integrated controller IP core 206 is integrated into another chip. For example, the integrated controller IP core 206 may be placed on the same die or integrated as an integral part of a processor (e.g., a CPU or an accelerator). In another example, the integrated controller IP core 206 may be placed on the same die or integrated as part of an application-specific integrated circuit (ASIC), and the ASIC may be connected to a processor through a CXL Bus.

The improved system has many advantages. The improved system uses a simplified communication approach, reduces or eliminates overhead, has lower latency and fewer points of failure, and is easier to debug. In addition, the improved system simplifies the logic, which decreases chip area and cost.

Figures 3A, 3B:
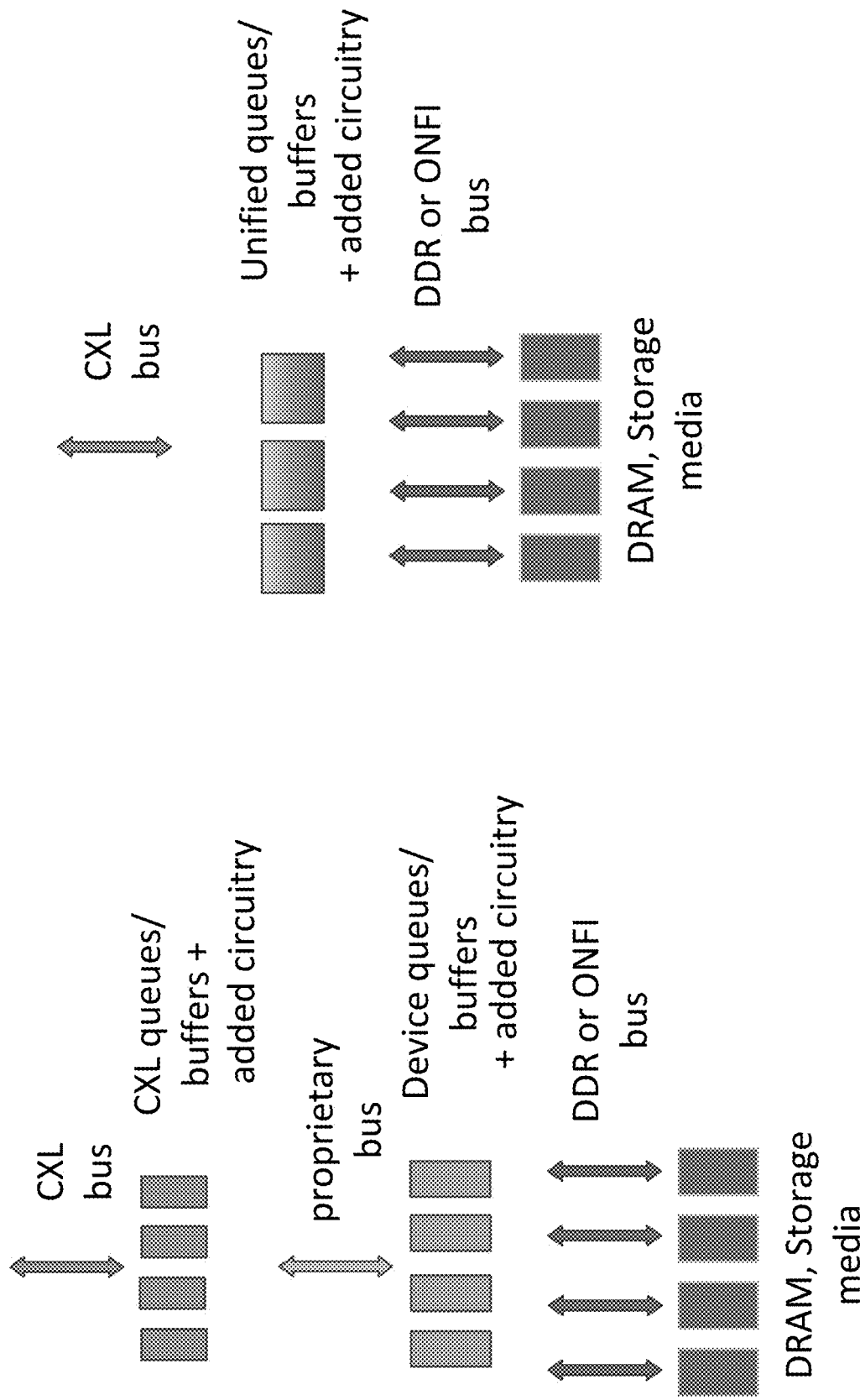
FIG. 3A illustrates that more resources are needed in the traditional system in which a CPU or accelerator accesses DRAM or other media via a CXL chip and a memory/storage controller.
FIG. 3B illustrates that fewer resources are needed in the system in which a CPU or accelerator accesses DRAM or other media via an integrated controller that integrates CXL and DDR/other storage protocols in a single device.

FIG. 3A illustrates that more resources are needed in the traditional system in which a CPU or accelerator accesses DRAM or other media via a CXL chip and a memory/storage controller. As shown in FIG. 3A, the CXL chip includes CXL queues, buffers, translators, synchronizers, or other circuitries. The memory/storage controller includes its own queues, buffers, translators, synchronizers, or other circuitries. For example, as shown in FIG. 1B, the CXL IP core 104 includes CXL queues and buffers (104D, 104E, and 104F) between different sub-modules. Memory/storage controller IP core 106 includes its own queues and buffers (106A, 106E, and 106F). Both the SOC interface 104C in the CXL IP core 104 and the SOC interface 106B in the memory/storage controller IP core 106 have their own sets of queues and buffers (104F and 106A).

FIG. 3B illustrates that fewer resources are needed in the system in which a CPU or accelerator accesses DRAM or other media via an integrated controller that integrates CXL and DDR/other storage protocols in a single device. Unified queues, buffers, translators, or other circuitries may be shared between CXL and other protocols on the unified device. As a result, the improved system uses a simplified communication approach, reduces or eliminates overhead, has lower latency and fewer points of failure, and is easier to debug. For example, as shown in FIG. 2C, CXL controller 206B shares unified queues or buffers 206E with each of the one or more memory/storage controllers 206C, thereby reducing the queue or buffer resources by half.

Another advantage of the improved system is that it provides a unified memory system. In the traditional system 100, a CPU 102 may have access to only a portion of the memory or storage. For example, as shown in FIG. 1A, the CPU 102 may access only two groups (indicated by a solid color) of memory or storage 108 but cannot access two other groups of memory or storage (indicated by a shaded color). In contrast, in the improved system 200 in FIG. 2A, the CPU 202 gets full access to all four groups of the DRAM or other media 208 (indicated by a solid color).

Figure 4:
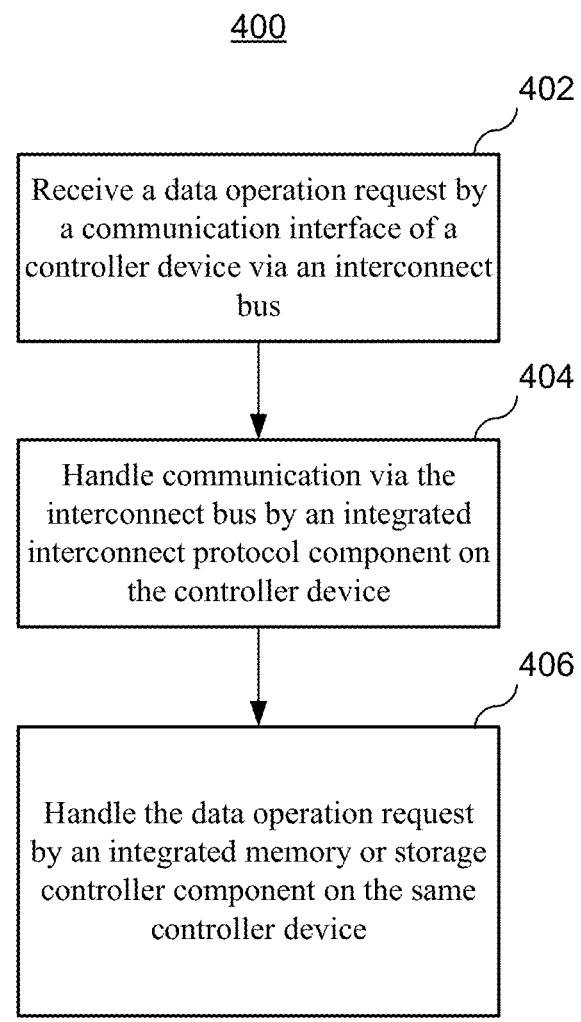
FIG. 4 illustrates an example of a process 400 for an improved system in which a processor accesses DRAM or other media via an integrated controller that integrates CXL and DDR/other storage protocols in a single device.

FIG. 4 illustrates an example of a process 400 for an improved system in which a processor accesses DRAM or other media via an integrated controller that integrates CXL and DDR/other storage protocols in a single device. At step 402, a data operation request is received by a communication interface of a controller device via an interconnect bus. In some embodiments, the communication interface of the controller device comprises a PCIe PHY interface. In some embodiments, the interconnect bus comprises a CXL Bus.

At step 404, communication via the interconnect bus is handled by an integrated interconnect protocol component on the controller device. The integrated interconnect protocol component supports coherency across a plurality of different processing devices external to the controller device. In some embodiments, the integrated memory or storage controller component may be a DDR SDRAM controller, LPDDR controller, or SCM controller.

At step 406, the data operation request is handled by an integrated memory or storage controller component on the same controller device. The integrated memory or storage controller component is configured to manage communication with a memory or data storage device external to the controller device. The memory or data storage device may be an LPDDR SDRAM, DDR SDRAM, or SCM.

In some embodiments, the integrated interconnect protocol component on the controller device and the integrated memory or storage controller component on the controller device are connected directly via a single custom and optimized interface. In some embodiments, the integrated interconnect protocol component on the controller device and the integrated memory or storage controller component on the controller device are connected directly without a separate interface on the integrated interconnect protocol component or another separate interface on the integrated memory or storage controller component. In some embodiments, the integrated interconnect protocol component on the controller device and the integrated memory or storage controller component on the controller device are connected directly without a standardized bus. In some embodiments, a unified set of queues or buffers is used to store data, wherein the unified set of queues or buffers is shared between the integrated interconnect protocol component on the controller device and the integrated memory or storage controller component on the controller device. In some embodiments, a set of queues or buffers for the integrated interconnect protocol component on the controller device and another set of queues or buffers for the integrated memory or storage controller component on the controller device are combined into a single unified set of queues or buffers.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A controller device, comprising:
a communication interface configured to receive, via an interconnect bus, data operation requests from a processor to access a plurality of different processing devices external to the controller device, wherein the plurality of different processing devices includes at least one memory device and at least one storage device, wherein the interconnect bus is configured to interconnect the plurality of different processing devices and support coherency across the plurality of different processing devices external to the controller device;
an integrated interconnect protocol component on the controller device and configured to handle communication via the interconnect bus; and
an integrated memory controller and storage controller component on the same controller device, and wherein the integrated memory controller and storage controller component is configured to handle the data operation requests including by being configured to manage communication with the plurality of different processing devices external to the controller device.

2. The controller device of claim 1, wherein the communication interface of the controller device comprises a PCI Express (PCIe) PHY interface.

3. The controller device of claim 1, wherein the interconnect bus comprises a Compute Express Link (CXL) Bus.

4. The controller device of claim 1, wherein the integrated memory controller and storage controller component comprises one of the following:
a Double Data Rate Synchronous Dynamic Random-Access Memory (DDR SDRAM) controller, a low-power DDR SDRAM (LPDDR) controller, or a storage class memory (SCM) controller.

5. The controller device of claim 1, wherein the plurality of different processing devices comprises one of the following:
a Double Data Rate Synchronous Dynamic Random-Access Memory (DDR SDRAM), a low-power DDR SDRAM (LPDDR), or a storage class memory (SCM).

6. The controller device of claim 1, wherein the integrated interconnect protocol component on the controller device and the integrated memory controller and storage controller component on the controller device are connected directly via a single custom and optimized interface.

7. The controller device of claim 1, wherein the integrated interconnect protocol component on the controller device and the integrated memory controller and storage controller component on the controller device are connected directly without a separate interface on the integrated interconnect protocol component or a separate interface on the integrated memory controller and storage controller component.

8. The controller device of claim 1, wherein the integrated interconnect protocol component on the controller device and the integrated memory controller and storage controller component on the controller device are connected directly.

9. The controller device of claim 1, further comprising a unified set of queues or buffers for storing data, wherein the unified set of queues or buffers is shared between the integrated interconnect protocol component on the controller device and the integrated memory controller and storage controller component on the controller device.

10. The controller device of claim 1, wherein a set of queues or buffers for the integrated interconnect protocol component on the controller device is combined with another set of queues or buffers for the integrated memory controller and storage controller component on the controller device to form a single unified set of queues or buffers.

11. A method, comprising:
receiving by a communication interface of a controller device, via an interconnect bus, data operation requests from a processor to access a plurality of different processing devices external to the controller device, wherein the plurality of different processing devices includes at least one memory device and at least one storage device, wherein the interconnect bus is configured to interconnect the plurality of different processing devices and support coherency across the plurality of different processing devices external to the controller devices;
handling communication via the interconnect bus by an integrated interconnect protocol component on the controller device; and
handling the data operation requests by an integrated memory controller and storage controller component on the same controller device, wherein the integrated memory controller and storage controller component is configured to manage communication with the plurality of different processing devices external to the controller device.

12. The method of claim 11, wherein the interconnect bus comprises a Compute Express Link (CXL) Bus.

13. The method of claim 11, wherein the integrated memory controller and storage controller component comprises one of the following:
a Double Data Rate Synchronous Dynamic Random-Access Memory (DDR SDRAM) controller, a low-power DDR SDRAM (LPDDR) controller, or a storage class memory (SCM) controller.

14. The method of claim 11, wherein the plurality of different processing devices comprises one of the following:
a Double Data Rate Synchronous Dynamic Random-Access Memory (DDR SDRAM), a low-power DDR SDRAM (LPDDR), or a storage class memory (SCM).

15. The method of claim 11, further comprising:
connecting the integrated interconnect protocol component on the controller device and the integrated memory controller and storage controller component on the controller device directly via a single custom and optimized interface.

16. The method of claim 11, further comprising:
connecting the integrated interconnect protocol component on the controller device and the integrated memory controller and storage controller component on the controller device directly without a separate interface on the integrated interconnect protocol component or a separate interface on the integrated memory controller and storage controller component.

17. The method of claim 11, further comprising:
connecting the integrated interconnect protocol component on the controller device and the integrated memory controller and storage controller component on the controller device directly.

18. The method of claim 11, further comprising:
storing data in a unified set of queues or buffers, wherein the unified set of queues or buffers is shared between the integrated interconnect protocol component on the controller device and the integrated memory controller and storage controller component on the controller device.

19. The method of claim 11, further comprising:
combining a set of queues or buffers for the integrated interconnect protocol component on the controller device and another set of queues or buffers for the integrated memory controller and storage controller component on the controller device into a single unified set of queues or buffers.

20. A controller device, comprising:
a communication interface configured to receive, via an interconnect bus, data operation requests from a processor to access a plurality of different processing devices external to the controller device, wherein the plurality of different processing devices includes at least one memory device and at least one non-coherent device, wherein the interconnect bus is configured to interconnect the plurality of different processing devices and support coherency across the plurality of different processing devices external to the controller device;
an integrated interconnect protocol component on the controller device and configured to handle communication via the interconnect bus; and
an integrated memory controller and storage controller component on the same controller device, and wherein the integrated memory controller and storage controller component is configured to handle the data operation requests including by being configured to manage communication with the plurality of different processing devices external to the controller device.

* * * * *